United States Patent [19]

Cairns

[11] Patent Number: 4,616,900
[45] Date of Patent: Oct. 14, 1986

[54] COAXIAL UNDERWATER ELECTRO-OPTICAL CONNECTOR

[75] Inventor: James L. Cairns, Mims, Fla.

[73] Assignee: Lockheed Corporation, Burbank, Calif.

[21] Appl. No.: 595,686

[22] Filed: Apr. 2, 1984

[51] Int. Cl.$^4$ ................................. G02B 6/42
[52] U.S. Cl. ................................. 350/96.20; 174/705
[58] Field of Search ............... 350/96.20, 96.21, 96.22, 350/96.23; 174/705; 339/60 R, 60 C, 60 M

[56] References Cited

U.S. PATENT DOCUMENTS

| | | | |
|---|---|---|---|
| 4,373,767 | 2/1983 | Cairns | 339/94 C |
| 4,412,878 | 11/1983 | Guazzo | 350/96.21 X |
| 4,448,483 | 5/1984 | Ryley, Jr. | 350/96.21 |
| 4,449,784 | 5/1984 | Basov et al. | 350/96.21 |

FOREIGN PATENT DOCUMENTS

| | | | |
|---|---|---|---|
| 56-089708 | 7/1981 | Japan | 350/96.20 |
| 57-169713 | 10/1982 | Japan | 350/96.20 |
| 58-042010 | 3/1983 | Japan | 350/96.20 |
| 58-136009 | 8/1983 | Japan | 350/96.20 |

*Primary Examiner*—William L. Sikes
*Assistant Examiner*—Frank González
*Attorney, Agent, or Firm*—Brown, Martin, Haller & Meador

[57] ABSTRACT

A coaxial plug-and-socket type electro-optical connector for connection underwater. The male portion of the connector has an elongate alignment probe which includes a forward portion with an axially-tapered opening. A longitudinal electrically conductive probe mounted coaxially in the tapered opening has a forward tip housing an optically transmissive interface. The female portion of the connector has an elongate alignment probe mounted coaxially in it. The female portion alignment probe has a conically-shaped outer surface which fits into the male alignment probe's tapered opening to align the male and female portions. An electrically conductive receptacle is contained in an axially bored channel of the female probe; the receptacle has a socket which accepts the forward tip of the conductive probe. An optically transmissive interface is positioned at the rear of the socket entry and faces the male portion optical interface when the connector portions are joined. Upon mating the two portions of the connector, optical connection is provided through the facing optical interfaces and electrical connection through the contacting, electrically conductive probe and receptacle. The tapered surface and opening also seal the optical and electrical connections to water. When the connector is cycled underwater, seawater trapped between the sealed portions of the alignment probes enhances the transmissivity of the optical interface. When cycled above water, a few drops of oil or water introduced into the sealed portion enhances the transmissivity in a similar way.

23 Claims, 4 Drawing Figures

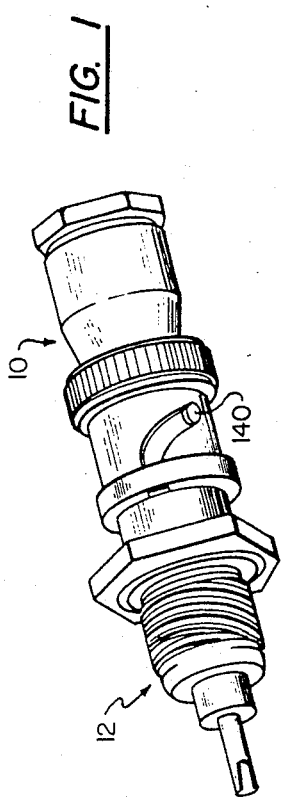
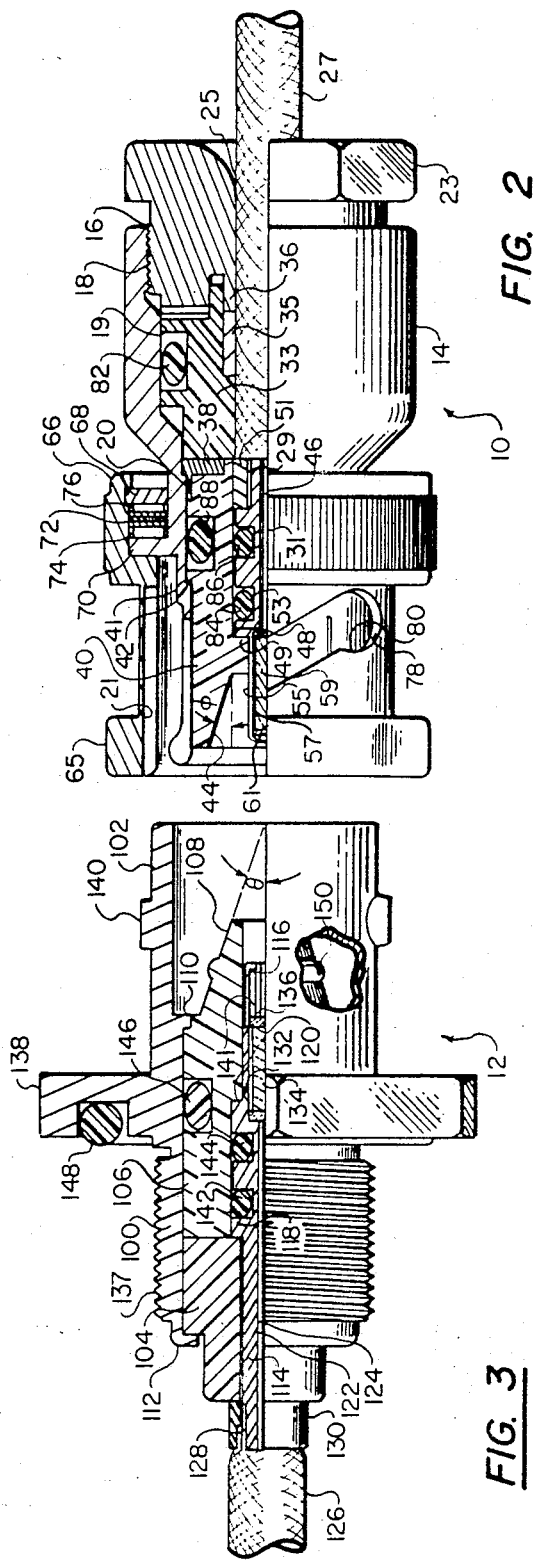

COAXIAL UNDERWATER ELECTRO-OPTICAL CONNECTOR

BACKGROUND OF THE INVENTION

The present invention relates to electrical and optical connectors, and more particularly to a connector providing electrical and optical interfaces which will operate in the presence of seawater which is trapped in the connector during underwater connection and disconnection.

In my U.S. Pat. No. 4,373,767, (which is incorporated herein by reference) I have disclosed an underwater coaxial connector having a penetrable seal enclosing a socket element which is disposed in a chamber filled with dielectric fluid. The seal permits repeated cycyling of the connector underwater without loss of dielectric fluid into the water or water leakage into the fluid.

In my U.S. patent application Ser. No. 482,919 filed on Apr. 7, 1983 and entitled "UNDERWATER CONNECTOR", I have described an improved connector which is adaptable to provide either a watertight electrical connection or a watertight optical connection for interconnecting optical fibers or both. The connector described in my patent application altered my connector seal design which is described in U.S. Pat. No. 4,373,767 by incorporating an end seal arrangement consisting of a neck bladder, a rubber grommet, and a muscle which keeps the neck of the seal closed, thereby preventing leakage of water into the connector or escape of an internal dielectric fluid from the connector seal.

While the underwater connectors of my U.S. Pat. No. 4,373,767 and my U.S. patent application Ser. No. 482,919 do represent significant improvements over prior art underwater coaxial connectors, both require the use of construction methods and materials which tend to increase the costs and complexity of manufacture. While there are many deployment applications having operational requirements which justify the use of my aforementioned disclosed connectors, it would be useful to provide an underwater electro-optical connector characterized and having a simplified design making the connector inexpensive and easy to manufacture, assemble, and use. As much of the complexity of the aforementioned connectors rests on the objective of preventing the intrusion of seawater into the connection interface, the relaxation or elimination of this requirement would greatly simplify the connector design.

Therefore, there exists an evident need for an electro-optical connector for use underwater and characterized in having both a simple design and the ability to operate when seawater is trapped in its electrooptical interface.

SUMMARY OF THE INVENTION

The present invention is directed to providing an underwater electro-optical connector having a design which is greatly simplified by elimination of the requirement to seal the electro-optical interface to prevent the intrusion of seawater into the connector interface. This approach rests upon the fact that optical connectors characteristically have a measurable gap across which interconnected optical channels must transmit. Design efforts in the past have been directed toward filling this gap with an index-matching dielectric fluid in order to reduce the optical transmission loss between the interconnected optical channels. Much of the complexity of previous connector designs has been directed toward retaining the index-matching dielectric fluid in the gap while preventing the leakage of seawater thereinto. The present connector takes advantage of the fact that trapped seawater can function as an index-matching fluid to enhance optical interconnection across the connector gap.

The underwater electro-optical connector of my invention includes a male unit with a hollow cylindrical body open at one end. An extended alignment probe is mounted coaxially in the body and has a forward portion with an axially-tapered opening adjacent to the open end of the male body. An electrically conductive probe is mounted coaxially in the tapered opening. The forward tip of the probe extends into the opening and has an axial bore which houses an optically transmissive interface including a collimating lens.

The female unit of the connector has a body which fits into the male body. An alignment probe is mounted coaxially in the female body and includes a conical outer surface which fits into the tapered opening of the male alignment probe to coaxially align the male and female units when they are joined. An axial channel is provided in the female alignment probe for housing an electrically conductive receptacle which has a forward entry to receive the forward tip of the conductive probe contained in the male unit. The entry portion of the conductive receptacle transits to an axial channel coaxial with the female alignment probe channel and contains an optically transmissive interface which includes a collimating lens.

When the connector units are mated, the electrically conducting probe and receptacle are slidably joined together to provide a conductive electrical interface across the connector boundary. The joining of the conductive probe and receptacle, in addition, places the optically transmissive interfaces adjacent one another with the collimating lenses aligned to provide an optical transmission path across the interface. Further, when the connector units are joined, the tapered opening of the male alignment probe and the axial channel in the female alignment probe together form an enclosure wherein water will be trapped when the connector units are mated underwater. The trapped water provides an index matching medium which reduces reflection-induced losses when light is transmitted between the collimating lenses of the optical interfaces. The completed optical path then consists of light passing from a small core fiber into a lens which expands and collimates the beam. The beam is then projected through the trapped seawater and windows into the second lens which focuses it onto the receiving fiber.

In order to seal the enclosure formed by the alignment probes so that the water trapped therein is not disturbed and the optical interference degraded, the probes are fabricated from a non-conductive synthetic material, with one probe being made hard and the other more compliant. In addition, the pitches of the tapered surface and opening are slightly offset so that when the probes are mated, the harder one slightly compresses and frictionally engages the softer one, thereby enhancing the seal between the probes. In addition, an annular ring can be formed on the tapered outer surface of the female alignment probe in order to enhance the compression and frictional engagement between the probes.

It is therefore a principal objective of the present invention to provide an underwater electro-optical connector having simple construction.

It is a further objective of the present invention to provide such a connector whose optical interface is improved by seawater which is trapped when the male and female portions of the connector are joined underwater. If joined above water, a small amount of water or oil introduced prior to mating accomplishes the same effect.

Still a further object of the present invention is to provide an underwater electro-optical connector in which optical connections are made through trapped water.

Still another object of the present invention is to provide such an underwater connector for simultaneously making electrical and optical connections.

These and other objects of the invention will become apparent with reference to the following specification when taken together with the drawings.

FIG. 1 is an illustration showing a perspective view of the mated connector.

FIG. 2 is an enlarged longitudinal sectional view of the male connector unit.

FIG. 3 is an enlarged longitudinal sectional view of the female connector unit.

DESCRIPTION OF THE PREFERRED EMBODIMENT

Figure 4:
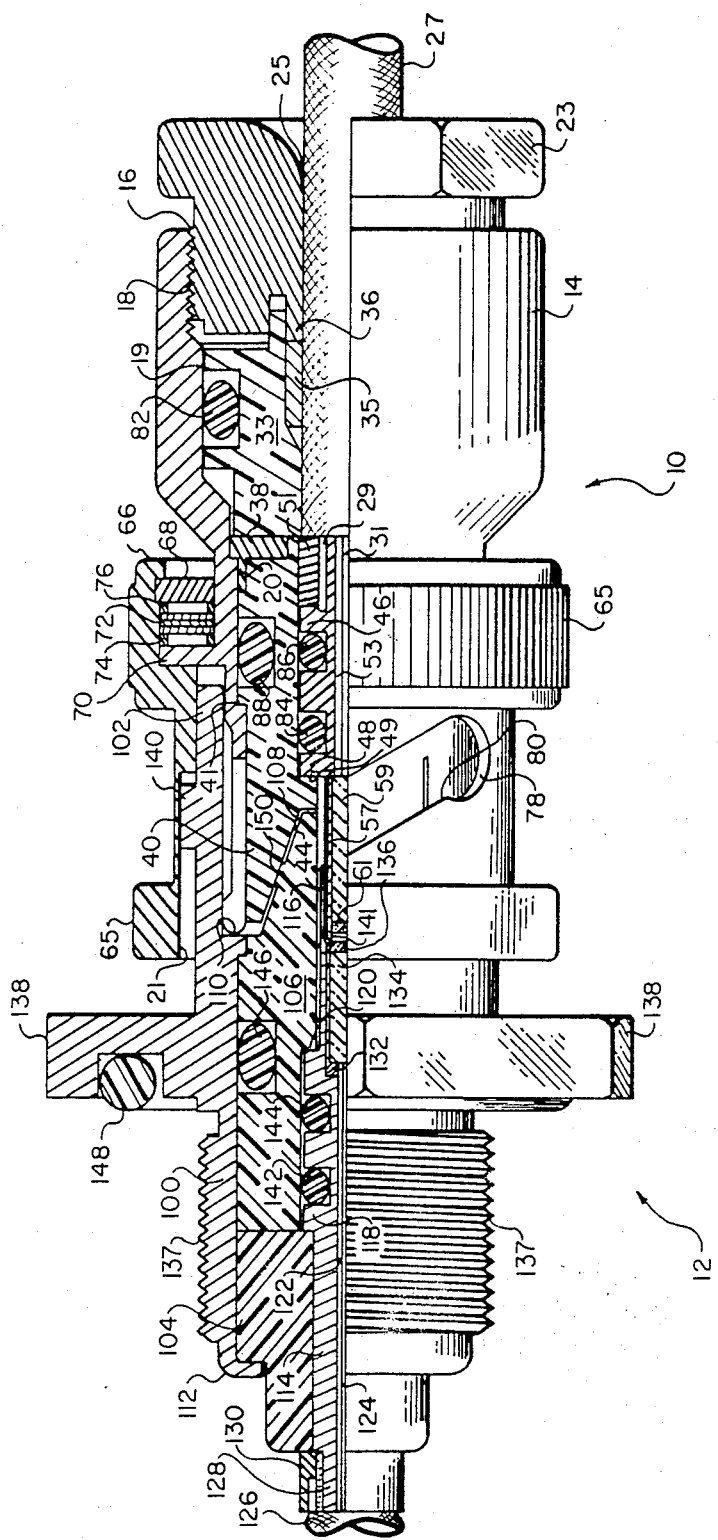
FIG. 4 is a side elevational view of the assembled connector, with parts in section.

As illustrated in FIG. 1, my underwater connector comprises a male unit 10 and a female unit 12, illustrated in detail in FIGS. 2 and 3, respectively. The two units interconnect to form an integral coaxial connector, as in FIGS. 1 and 4.

The male unit 10 includes a hollow termination housing 14 which has an end opening 16 with a threaded surface 18. The opening in the body 14 tapers first to an interior portion 19 and again to an interior portion 20, each portion having a successively smaller diameter than the preceding portion. At its engaging end, the hollow body 14 includes a hollow forward extension 21. A threaded jam bolt 23 engages the threaded surface 18 and includes an axial opening 25 which accepts a communication cable 27 containing both an electrical conductor 29 and an optical fiber 31. A bored-out packing sleeve 33 is seated in the forward opening 19 by the jam bolt 23. A smaller flexible sealing sleeve 35 is seated in a tapered axial channel of the sleeve 33 by an annular flange 36 on the jam bolt 23. The jam bolt 23 forces both the packing sleeve 33 and the sealing sleeve 35 into a tight frictional engagement with the jacket of the cable 27 to hold the male unit to the end of the cable.

Forward of the packing sleeve 33 is a washer-shaped press-fit flange 38 which is pressed toward the open end of the male unit 10 when the jam bolt 23 is threaded into the body 14. The flange 38 presses against an alignment and sealing insert 40 having an annular shaped flange 41 which contacts a shoulder 42 formed in the midchamber 20 of the housing 14. The alignment insert 40 is seated against the shoulder 42 by the pressure of the press-fit flange 38.

The sealing and alignment probe insert 40 has a generally cylindrical cross section whose axis is collinear with the male unit axis. An axial bore extends through the insert 40 and has an axially-tapered opening portion 44 beginning in the forward end of the insert 40. The tapered opening 44 has a pitch which is defined by the angle $\phi$ which the surface of the tapered opening makes with the male unit axis.

A male electrical contact 46 is housed in the axial bore of the insert 44. The male contact 46 includes a forward annular ring 48 which contacts a shoulder 49 formed in the insert 40. The electrical conductor 29 is held in physical and electrical contact with the contact 46 by a tubular crimp sleeve 51 which is crimped to the rear portion of the contact 46. The optical fiber 31 extends through an axial bore 53 of the male contact and may be secured therein by an epoxy compound. The contact 46 is held in the bore of the insert 40 through the pressure exerted by the packing sleeve 33 and cable 27 when the jam bolt 23 is threaded into the body 14.

An optical interface is provided in the forward tip 55 of the male contact by a metal ferrule which forms a widened forward portion of the male contact axial bore 53. The ferrule contains in its axial bore a collimating lens 59. The lens 59 can comprise, for example, a quarter-pitch graded refractive index lens of a type commercially available having an optical axis. The lens 59 may be seated within the bore of the ferrule 57 by an epoxy compound. The forward portion of the male contact axial bore 53 is sealed by an optical-quality glass cap 61 which can be brazed or epoxied to the contact to form a continuous watertight seal therewith. The principal purpose of the glass cap is to provide a robust barrier between the seawater and the collimating lenses which generally are made from materials too easily etched by seawater. The optical characteristics of the glass cap 61 can be selected to provide filtering of any optical signal transmitted therethrough. For example, the glass cap 61 can be designed to transmit optical signals lying in selected portions of the infrared spectrum. When the male unit 10 is attached to the end of the cable 27, a portion of the cable jacket is stripped away to expose a length of the fiber 31 and a shorter length as the electrical conductor 29. The fiber is inserted into the central bore 53 so that its exposed end abuts the lens 59. Epoxy is inserted into the bore to secure the fiber therein.

As shown in the Figures, the forward tip 55 of the electrical male contact extends substantially into the tapered opening 44 and is adjacent the opening in the forward extension 21 of a hollow housing 14.

A coupling mechanism for the male connector unit comprises a locking sleeve 65 which is coaxial with and free to rotate about the forward extension 21 of the male housing. A swaged locking sleeve retainer flange 66 is formed in the rearward portion of the sleeve 65 and grasps the edge of a split retainer ring 68. The sleeve 65 is retained on the hollow housing body 14 by a flange 70 formed thereon. A series of stacked wave-washers 72 and regular washers 74 and 76 are pinched between the retainer ring 68 and the flange 70. One or more openings are provided in the surface of the locking sleeve 65, the edges of which form cam surfaces 78 and 80 which are useful for locking the sleeve to the female connector unit as disclosed below.

When the male unit is assembled as illustrated, it is sealed against the leakage of water into its interior from its rearward portion by the watertight seal 35 and the O-ring 82. Water is prevented from leaking from the tapered opening 44 around the male contact 46 by the O-rings 84 and 86. Finally, O-ring 88 prevents the leakage of water between the insert 40 and the forward extension 21 of the body toward the electrical and optical conductors 29 and 31.

The body of the male contact 46 is made from an electrically conductive material so that a continuous electrical path exists from the forward tip 55, through the contact to the crimped-on electrical conductor 29. The optical interface path through the male unit is provided via the glass cap 61, the collimating lens 59, and the optical fiber 31 which is butted against the lens 59. As is known in the art, proper positioning of the abutting end of the fiber 31 on the end of the collimating lens 59 will align the optical transmission axis of the fiber with the optical axis of the lens 59. The relationship of the contact 46 and the alignment insert 40 is such that the optical axes of the fiber and lens are collinear with the male unit axis.

The female unit of the underwater connector includes a hollow outer housing 100 having a forward section 102 which fits over the forward extension 21 of the male body 14 and within locking sleeve 65. A bored retainer guide 104 is housed in the rearward portion of the housing 100 and butts against a sealing and alignment probe 106 which transitions to a conically-shaped forward portion 108. The surface of the forward portion 108 has a pitch which is described by an angle $\theta$ which the surface makes with the female unit axis. The guide 104 and probe 106 are held in the housing 100 between an annular shoulder 110 formed on the interior of the housing and a swaged retainer flange 112 on the rear of the housing 100. The guide 104 and the probe 106 have communicating axial bores which hold a conductive electrical contact 114 having a forward slotted receptacle socket 116 which expands when the forward tip 55 of the male contact slides thereinto. The electrical contact 114 is held centered in the outer housing 100 by means of a pair of shoulders 118 and 120 which are formed in the contact and which abut opposing surfaces in the guide 104 and the probe 106, respectively.

The contact 114 has a central axis bore 122 which is suitable for containing an optical fiber 124 contained in a cable 126. The cable 126 also contains a conventional electrical conductor 128; the cable and conductor are crimped by a sleeve 130 to hold both to the rear portion of the contact 114.

An optical interface is formed adjacent the forward socket 116 of the contact 114 and includes a bored metal ferrule 132 holding a collimating optical lens 134 which is identical in all respects to the lens 59. In addition, an optical quality glass window 136 is placed in abutting relationship with one face of the lens 134 and brazed or epoxied to the forward end of the bore 122 to provide a water impenetrable seal therewith. When the female unit 12 is attached to the end of the cable 126, a portion of the cable jacket is stripped away to expose a length of the fiber 124 and a shorter length of the electrical conductor 128. The fiber is inserted into the central bore 122 to abut the other end of the lens 134 and held thereto by an epoxy compound which is permitted to flow into and fill the central bore 122. As with the fiber 31, the end of the fiber 124 is positioned with respect to the end face of the lens 134 so that the optical transmission axis of the fiber and the lens are collinear. Further, the relative arrangement of the housing 100, the probe 106 and the contact 114 are such as to make the optical transmission axis of the lens 134 collinear with the female unit axis.

A path for electrical interconnection is provided through the electrical lead 128 which is crimped to the conductive contact 114 so that electrical signals can be conducted between the lead 128 and the forward receptacle 116.

The housing 100 includes a threaded portion 137 which can receive a lock nut (not shown) which is suitable to secure the female unit 12 to a bulkhead, with the bulkhead pinched between the lock nut and the annular securing flange 138 formed on housing 100. pair of locking pins 140 are formed on the forward portion 102 of the housing. Two O-rings 142 and 144 are held between the contact 114 and the alignment probe insert 106 to prevent the passage of water therebetween. Another O-ring 146 forms a similar water leakage barrier between the housing 100 and the probe 106. A fourth O-ring 148 can provide a water leakage barrier between the female unit housing and a bulkhead to which the housing may be attached.

To connect the male and female units of the connector and thereby provide an electro-optical interconnection between the cables 27 and 126, the forward portion 102 of the female unit is inserted into the locking sleeve 65 with the locking pins 140 engaging the cam surfaces in the locking sleeve. At the same time, the conical surface 108 of the female alignment probe enters the tapered opening 44 of the male alignment insert and the forward tip of the male contact 46 is inserted into the socket receptacle 116 of the female contact 114. This centers and axially aligns the two units and their respective optical interfaces. The units are then drawn axially together by rotation of the locking sleeve 65 which forces the locking pins 140 toward the cam surfaces 80. When the pins 140 contact the surfaces 80, the units are locked together with the forward tip 55 driven into and seated in the socket receptacle 116. Wave washers 72 hold the units sealably together with constant positive spring force.

When the units are joined and locked by the pins 140 contacting the cam surfaces 80, the optical interfaces are positioned in a close abutting relationship, with their respective optical axes collinearly aligned. The shoulder 141, formed on the rear part of the socket receptacle 116, prevents the forward tip 55 from being inserted so far into the receptacle that the windows 136 and 61 contact. Preferably, when the connector units are joined, the windows are maintained with a slight gap between them in order to protect the optical finish of their respective facing surfaces.

As the connector units are brought together under water, water is trapped between the conical surface 108 of the female alignment probe and the tapered opening 44 of the male alignment insert. In the preferred embodiment of the invention, the surface and the opening come together to form an enclosure which opens into the central bore of the female alignment probe 106. The water which is trapped therein is prevented from flowing axially through either connector unit by the O-rings 84, 86, 142 and 144. The probes are formed from a synthetic dielectric material, with the hardness of one probe being greater than that of the other probe. This, together with the difference in the pitches of the tapered sections of each probe ($\phi > \theta$) will cause the softer probe to compress slightly and to form a frictional watertight seal with the harder probe. The efficiency of the frictional seal can be enhanced by the provision of an annular ridge or nib 150 on the conical surface 108. The nib 150 acts effectively as an embedded O-ring to improve the water seal between the probes.

Those skilled in the art of optical connector design will understand that water which is trapped in the central bore of the female probe 106 will remain undisturbed by inflows or outflows and so will enhance the optical coupling of any signals which are transmitted between the optical windows 61 and 136. It will be evident that the refractive index of water will closely match that of the windows, thereby reducing diffraction and reflection losses at the interface therebetween. This aspect of the underwater connector of the invention eliminates the need for providing a sealed chamber which contains an indexmatching fluid to perform the same function. It should also be evident that the trapped water will enhance the electrical conductivity between the forward tip 55 of the male contact and the socket receptacle 116 of the female contact. This increases the conductivity of the electrical path which the joined contacts provide between the electrical conductors 29 and 128.

The parts of the connector which form the electrical path, that is, the contacts 114 and 46 are preferably made from materials which are substantially the same as those of the electrical conductors 29 and 128. In order to electrically isolate the contacts, the alignment probes 40 and 106, the retainer guide 104 and the packing sleeve 33, all of which surround the contacts, are preferably made from insulating materials. This arrangement permits the male unit body 14 and the female unit housing 100 to provide a second electrical path for another electrical conductor pair (not shown) which is electrically isolated from the electrical path provided for the conductors 29 and 128. The second electrical path can be implemented by, for example, crimping or soldering one conductor of the other pair to the body 14, and the other of the pair to the housing 100. The alternative electrical path would then run from one conductor through the housing 100, the forward section 21, and the body 14 to the other conductor.

While the material from which the alignment probes are constructed can be left to the choice of the designer, one particularly suitable material which will provide the required characteristics of electrical insulation, flexibility, and hardness is the synthetic plastic material which is available under the trade name TEFLON. However, other similar materials could be used.

Having described my invention, I now claim:

1. An underwater electro-optical connector, comprising:
    a male unit with an open end;
    a first electrically-conductive member in the open end, including bore means for receiving an electrical conductor, means for connecting to an optical conductor, and a forward tip;
    first optically transmissive means adjacent said male unit bore means for conducting optical signals to and from said bore means and including a collimating leans in said forward tip;
    a female unit for detachably fitting to said male unit open end;
    a second electrically-conductive member in said female unit for connecting to said first conductive member when said female unit fits into said male unit and including bore means for receiving another optical conductor and means for connecting to another electrical conductor;
    second optically transmissive means adjacent said female conductive member bore means for conducting optical signals to and from said bore means; and
    alignment means in said male and female units for aligning said first and second optically transmissive means and for forming a watertight chamber when said male and female units are fitted together, said chamber containing said first and second conductive members and said first and second optically transmissive means.

2. The connector of claim 7 wherein said female unit conductive member includes a socket for receiving said forward tip and said second optically transmissive means includes another collimating lens adjacent said socket.

3. An underwater electro-optical connector comprising:
    a male unit including an insulating alignment insert, said insert including a forward opening and a recess tapered inwardly from said opening;
    an electrically conductive probe device seated in said tapered recess and having a forward tip adjacent said opening;
    a first optically transmissive interface seated in said forward tip and including a collimating means for conducting light signals;
    a female unit including an insulating alignment probe with a tapered outer surface for fitting into and forming a water-tight enclosure with said tapered recess;
    an electrically conductive receptacle device held in said alignment probe and including a receiving recess for receiving said forward tip when said alignment probe is fitted into said tapered recess; and
    a second optically transmissive interface in said receptacle device and including a collimating means for conducting light signals.

4. The connector of claim 3 wherein, when said forward tip is received in said receiving recess, said tip holds said first optical interface adjacent to and in optical alignment with said second optical interface.

5. The connector of claim 4 wherein each of said collimating means comprises a collimating lens.

6. The connector of claim 5 wherein said collimating lens comprises a quarter pitch graded refractive index lens.

7. The connector of claim 5 wherein each of said optical interfaces comprises an optical quality window sealingly held between a respective one of said collimating lenses and said enclosure to form a waterproof seal acting between said lens and said enclosure.

8. The connector of claim 3 further including a pair of optical fibers, each held in an optically conductive connection with a respective one of said optically transmissive interfaces.

9. The connector of claim 8 further including a pair of communication cables, each cable holding a respective one of said fibers.

10. The connector of claim 9 wherein each of said cables includes an electrical conductor and each of said units includes means for connecting a respective conductor to the conductive device in said unit.

11. The connector of claim 4 wherein said alignment probe and said insert are each formed from an elastic material and the material of said probe is harder than the material of said insert.

12. The connector of claim 11 wherein the respective pitches of said tapered opening and said tapered outer surface are unequal.

13. The connector of claim 12 further including an annular rib formed on said tapered outer surface.

14. The connector of claim 13 further including a pair of communication cables, each of which includes one or more electrical conductors and an optical fiber, and wherein each of said units includes means for attaching to a respective cable, means for holding a respective optical fiber in an optically transmissive connection with the respective optical interface in said unit, means for electrically connecting one of said conductors to the respective conductive device in said unit, and means for insulating said connected conductor and device from another electrical path including another of said conductors.

15. An underwater electro-optical connector, comprising:
a first connector unit;
an alignment insert mounted in said first connector unit and having a forward portion with a tapered opening;
an electrically conductive probe mounted in said alignment insert and having a probe tip extending into said tapered opening;
first optical means housed in said probe tip for conducting an optical signal;
a second connector unit adapted to be joined to said first connector unit;
an alignment probe mounted in said second connector unit and having a tapered outer surface that engages said tapered opening to align said connector units and that forms a sealed enclosure with said tapered opening when said connector units are joined;
an electrically conductive receptacle housed in said alignment probe that receives said probe tip in said sealed enclosure when said tapered outer surface engages said tapered opening; and
second optical means housed in said receptacle for exchanging an optical signal with said first optical means when said probe tip is received in said receptacle.

16. The connector of claim 15 wherein each of said optical means comprises:
a collimating lens; and
an optical-quality window disposed between said lens and said sealed enclosure and mounted to seal said lens from said enclosure.

17. The connector of claim 16 wherein said collimating lens comprises a quarter-pitch graded refractive index lens.

18. The connector of claim 16 wherein said alignment insert and alignment probe are each formed from a resilient insulating material and said insert material has a different hardness than said probe material.

19. The connector of claim 18 wherein said tapered opening has a first taper pitch angle and said tapered outer surface has a second tapered pitch angle unequal to said first taper pitch angle.

20. The connector of claim 16 further including an annular rib formed on said tapered outer surface.

21. The connector of claim 16 wherein said alignment insert and alignment probe are both formed from an electrically insulating material.

22. The connector of claim 16 further including means for mounting at least one of said connector units to a stationary surface.

23. An underwater electro-optical connector, comprising:
a male unit with an open end;
a first electrically-conductive member in the open end, including bore means for receiving an optical conductor and means for connecting to an electrical conductor;
first optically-transmissive means adjacent said male unit bore means for conducting optical signals to and from said bore means;
a female unit for detachably fitting to said male unit open end;
a second electrically-conductive member in said female unit for connecting to said first conductive member when said female unit fits into said male unit and including bore means for receiving another optical conductor and means for connecting to another electrical conductor;
second optically-transmissive means adjacent said female conductive member bore means for conducting optical signals to and from said bore means; and
first and second alignment means in said male and female units, respectively, for aligning said first and second optically-transmissive means and for forming a watertight chamber when said male and female units are fitted together, said chamber containing said first and second conductive members and said first and second optically-transmissive means, said first alignment means including a substantially cylindrical alignment receptacle having a portion with an axially tapered opening and said second alignment means including a substantially cylindrical alignment probe having a conically-shaped outer surface for fitting into said axially tapered opening when said female unit fits into said male unit.

* * * * *

UNITED STATES PATENT AND TRADEMARK OFFICE
CERTIFICATE OF CORRECTION

PATENT NO. : 4,616,900
DATED : October 14, 1986
INVENTOR(S) : James L. Cairns

It is certified that error appears in the above-identified patent and that said Letters Patent is hereby corrected as shown below:

Claim 1, line 45, column 7, delete "electrical" and insert therefor --optical--.

Claim 1, line 46, column 7, delete "optical" and insert therefor --electrical--.

Claim 1, line 51, column 7, delete "leans" and insert therefor --lens--.

Claim 2, line 3, column 8, delete "7" and insert therefor --1--.

Signed and Sealed this

Tenth Day of March, 1987

Attest:

DONALD J. QUIGG

*Attesting Officer*  *Commissioner of Patents and Trademarks*